Feb. 2, 1954 — J. A. FANELLI — 2,667,996
COMBINATION PACKBOARD AND SLED
Filed Aug. 3, 1950 — 2 Sheets-Sheet 1
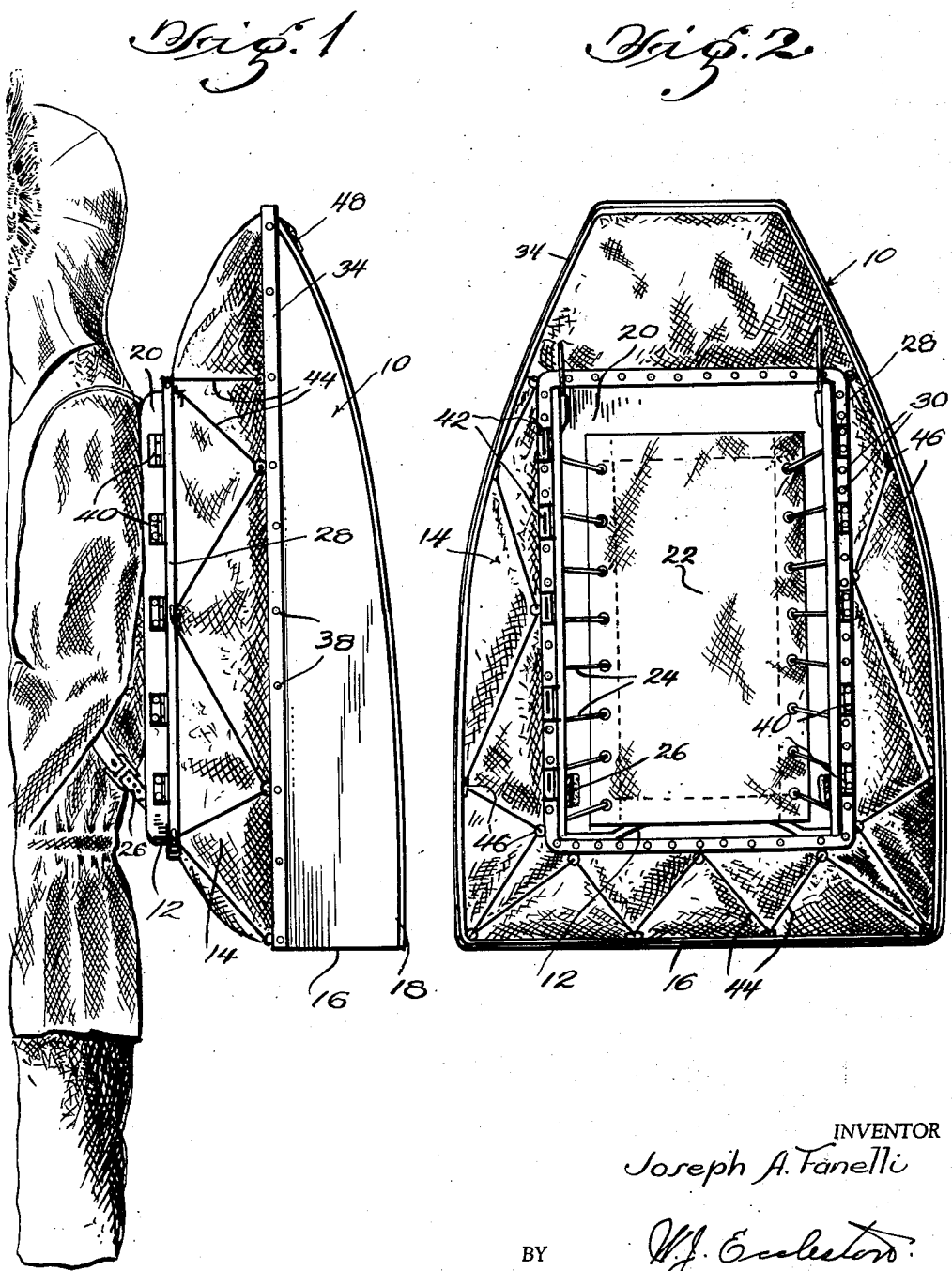
INVENTOR
Joseph A. Fanelli
BY
ATTORNEY Feb. 2, 1954
J. A. FANELLI
2,667,996
COMBINATION PACKBOARD AND SLED
Filed Aug. 3, 1950
2 Sheets-Sheet 2
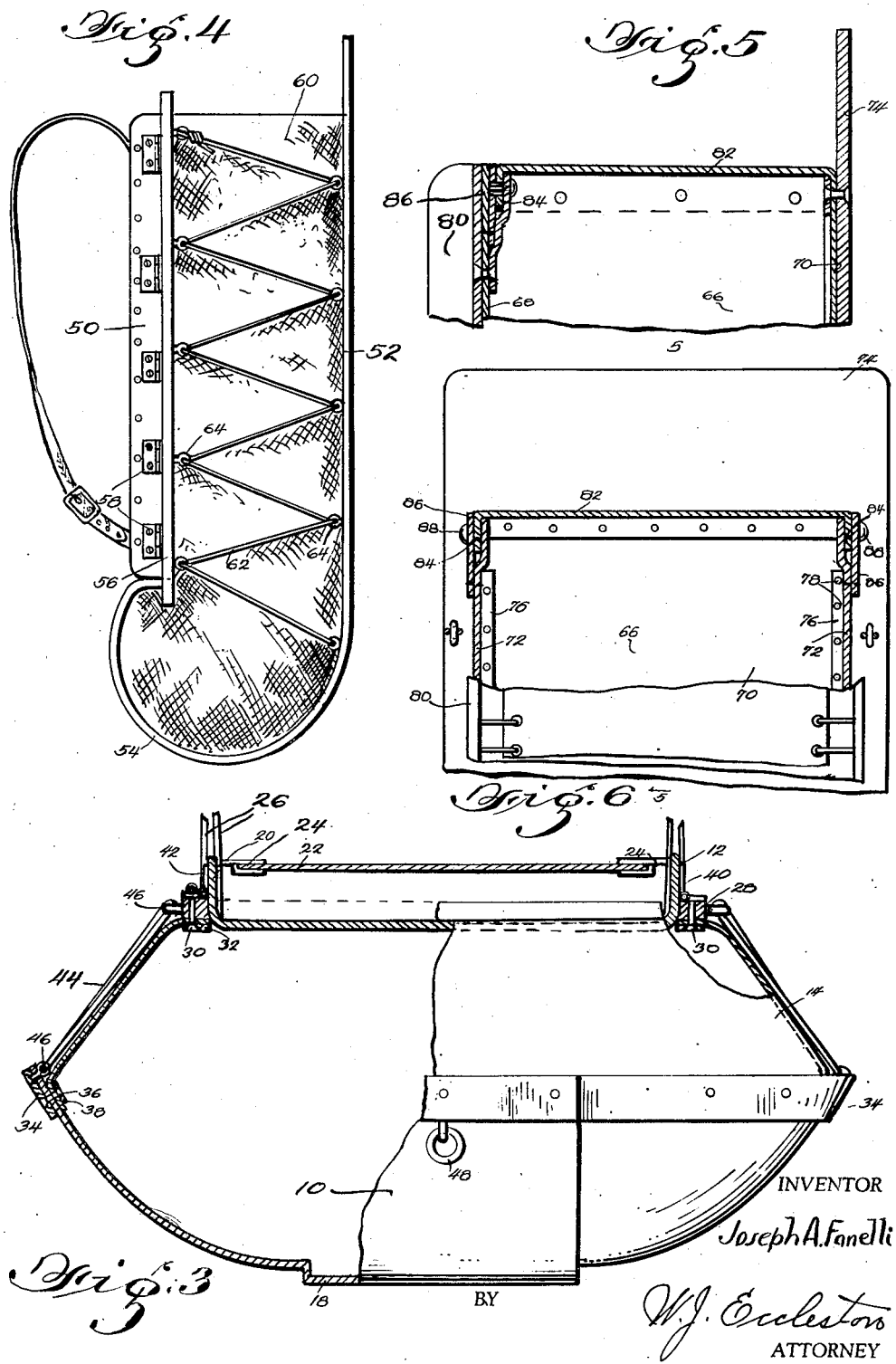
INVENTOR
Joseph A. Fanelli
BY
W. J. Eccleston
ATTORNEY Patented Feb. 2, 1954

2,667,996

UNITED STATES PATENT OFFICE 2,667,996

COMBINATION PACKBOARD AND SLED

Joseph A. Fanelli, United States Army

Application August 3, 1950, Serial No. 177,547

11 Claims. (Cl. 224—46)

(Granted under Title 35, U. S. Code (1952), sec. 266)

This invention, if patented, may be manufactured by or for the Government for governmental purposes without the payment to me of any royalty thereon.

The present invention relates to load carrying devices and, more particularly, to a load carrying device which is adapted to be transported either manually by a bearer or as a sled over snow or ice covered terrain.

Various types of load carrying devices for transporting loads by human effort have heretofore been developed for civilian and military use including various types of sleds and various types of bearer transportable load carrying packboards. A disadvantage of these prior load carrying devices is the fact that they are usually limited to a specific manner of transportation. For example, packboards are adaptable only for bearer transportation and while this makes them suitable for use on any kind of terrain where man can travel, certain regions or conditions of climate may make it desirable to transport a load at one time manually and at other times in some other manner. The present invention is concerned with a load carrying device for obviating these disadvantages of existing load carrying devices, at least insofar as devices for transporting loads over terrain subject to ice or snowfall are concerned.

Accordingly, an object of the invention is to provide a new and improved load carrying device adaptable for manual transportation by a bearer or for transportation over snow or ice covered terrain as a sled which device is always ready for transportation in either manner without requiring adjustments or changes to be made when the manner of transporting the device is to be changed other than to remove it from the back of a bearer or place it on the back of a bearer.

Another object of the invention is to provide a new and improved load carrying device, the load carrying capacity of which may be readily varied so that loads are securely held in place in the device irrespective of variations in the size of the loads carried.

A further object of the invention is to provide a convertible load carrying device comprising a part adapting the device to be transported over ice or snow covered terrain as a sled and a packboard for manually transporting the device which packboard is relatively easily detached so that it may be used separately from the rest of the device.

A still further object of the invention is to provide a load carrying device designed optionally to be transported manually by a bearer or as a sled which is particularly adapted for transporting the accoutrements of military personnel.

A more general object of the invention is to provide a new and improved convertible load carrying device of the type set forth in the preceding objects, which is simple, durable, and inexpensive in construction, light in weight, and which is so constructed that parts thereof which may wear may be readily replaced.

A more specific object of the invention is to provide a new and improved load carrying device with a novel means for gaining access to the load carrying space in the device.

These and other objects, advantages and capabilities of the invention will become apparent from the following description wherein reference is had to the accompanying drawings in which:

Fig. 1 is a side elevational view of the improved load carrying device of the present invention in position for manual transportation on the back of a bearer.

Fig. 2 is a top plan view of the load carrying device disclosed in Fig. 1.

Fig. 3 is a view of the improved load carrying device of Fig. 1 on a slightly enlarged scale partly in transverse section and partly in front elevation.

Fig. 4 is a side elevational view of a modification of the invention.

Fig. 5 is a fragmentary vertical sectional view on a longitudinal plane of a load carrying device generally similar to that disclosed in Fig. 4; but having a different means of gaining access to the interior of the device; and Fig. 6 is a horizontal sectional view partly in elevation of the modification disclosed in Fig. 5.

The modification of the invention disclosed in Figs. 1 to 3 comprises a shell or hull-like body member 10, a packboard 12 and a flexible fabric connecting sheet or wall 14 of canvas or other suitable fabric material extending between the packboard 12 and hull 10 to form a closed container or knapsack. The hull 10 preferably comprises a unitary stamping of lightweight metal, such as an aluminum alloy, for example, or it may be made from plywood of suitable thickness. As best seen in transverse section (Fig. 3) the opposite sides of the hull are arcuate. The peripheral edges of the sides are curved convergingly toward the forward end of the hull (Fig. 2) while the bottom curves upwardly from its rear end toward its forward end. A rigid body is thus provided which is generally similar to a flat bottomed boat in shape and which is provided with an integral rear end wall 16, Fig. 2. Rigidity of the hull may be increased by providing a longitudinally extending depressed part 18 in the bottom of the hull to thus form a rib. This rib assists in maintaining the hull on a straight course when it is being used as a sled.

Since the packboard 12 may be of more or less conventional construction, it will not be described in detail. However, a suitable packboard comprises a generally channel-shaped frame 20 of aluminum alloy and a canvas cover 22 for engaging the back of a bearer. The opposite longitudinal edges of the canvas cover 22 are lapped and lacing cords 24 are provided to secure the opposite longitudinal edges of the cover to the channel sides of the packboard frame 20, these lacing cords providing a means for adjusting the stress placed upon the cover 22. In use, loads are lashed to the back of the frame of packboards of this type, and the packboard is carried on the back of a bearer with the canvas cover 22 bearing against the back of the bearer. Suitable shoulder straps shown fragmentarily at 26 are provided for harnessing the packboard to the back of a bearer.

A frame 28 which may be made from aluminum alloy is internally dimensioned closely to surround the packboard frame 20. Along its inner peripheral edges the fabric connecting wall 14 is attached to the outer peripheral edges of frame 28. Any suitable means may be utilized for this purpose. In the drawings rivets 30 are shown along with metal straps 32 fixed to the frame 28 by the rivets 30 and clamping the inner edge of the fabric connecting wall 14 to the frame 28 along its outer peripheral edge. As best seen in Figure 3 a reenforcing strip 34 is provided along the outer side of the peripheral edge of hull 10 and the fabric wall 14 is fastened to this edge by means of rivets 36 and metal straps 38 in the same manner as the opposite edge of this fabric wall is attached to the frame 28. Frame 28 and the hull 10 are thus permanently connected together by the canvas sheet or wall 14. Access to the space defined by the hull 10 and fabric wall 14 is had through the frame 28.

The frame 28 is secured to the packboard 12 by means of hinges 40 along one of its longitudinal edges and cooperating hasps 42 along its opposite longitudinal edge. Thus, when the hasps are released, the packboard 12 may be swung outwardly of the opening in frame 28 upon hinges 40 so that access may be had to the interior of the space defined by the hull 10, fabric wall 14 and frame 28 through the opening in this frame to thus facilitate packing of material in the load carrier or its removal therefrom. If desired, hasps only may be used to connect the packboard 12 and frame 28 so that the packboard may be readily completely separated from the frame when it is desired to use the packboard alone.

In order to adjust the load carrier in accordance with the size of the load to be carried, a lacing cord or rope 44 is provided which is laced through eye screws or rivets 46 secured along the outer edge frame 28 and the inner side of the upper edge of hull 10.

From the above description of the construction of the form of the invention disclosed in Figures 1 to 3, the manner in which it may be utilized should be apparent. When the load packed in the load carrying device is light, it is preferable to transport the device manually. However, when the load is heavy and the terrain over which it is to be transported is either snow or ice covered, the hull 10 may be made to function as a sled so that the load may be drawn over the ground in the same manner as a sled. To facilitate this, a draw ring 48 is provided on the forward end of the hull 10 through which a draw rope may be strung.

A modification of the invention is disclosed in Fig. 4 in which a packboard 50 similar to the packboard 12 previously described is used. In this case, a rigid body member 52 is provided in place of hull 10 which body member has an arcuate forward end 54 so that the body member 52 is shaped generally similar to a miniature toboggan. A frame 56 similar to frame 28 has a hinged connection with the packboard 50 similar to the hinged connection previously described. For this purpose hinges 58 are provided on the side shown in Figure 4 while hasps (not shown) are provided on the opposite side of the frame so that access may readily be had to the load carrying space in the device.

The body member 52 is connected to the frame 56 by means of a connecting wall 60 of fabric material such as canvas which may be secured along its opposite peripheral edges respectively to the frame 56 and body member 52. The same type of connection previously described, i. e., rivets and straps, may be used for this purpose. Lacing ropes are provided on the opposite sides of the load carrying device, that on the side shown in Fig. 4 being indicated by the number 62. As indicated in that view, this lacing 62 is strung through opposed eye screws or rivets 64 in the frame 56 and along the peripheral edges of body member 52 respectively. This completes the description of the form of the invention shown in Figure 4 from which the manner of using the same should be apparent since it is similar to the form of the invention disclosed in Figures 1 to 3.

As a modification of the invention, particularly adapted for use with the toboggan-like body member or sled disclosed in Fig. 4, a unitary load receiving container or knapsack 66 (Figs. 5 and 6) is provided. This knapsack has top and bottom walls 68 and 70 respectively and opposite side walls 72. One end of the knapsack 66 may be closed by an end wall (not shown) stitched to the side and top and bottom walls so that the knapsack is open at one end only; preferably the rear end.

Along its bottom wall 70, the knapsack 66 is fixed to the top side of a toboggan-like body member indicated fragmentarily at 74 in Figs. 5 and 6 by means of metal straps 76 riveted to the body member along the lateral edges of the bottom wall 70 by means of rivets 78. The top wall 68 of the knapsack 66 is fixed to the web of a packboard frame 80 in the manner indicated in Fig. 5.

If desired, bottom wall 70 of the knapsack 66 may be of sufficiently extended length at its open end to provide a closure 82 for this open end or a separate closure may be provided stitched or otherwise fixed to the bottom wall of knapsack 66. Closure 82 is provided with flaps 84 on its free edges adapted to engage over the free edges of the open end of the knapsack 66 as seen in Figures 5 and 6. This end of the knapsack is provided with a peripheral flap 86 stitched thereto to cooperate with the edge of the side and top and bottom walls of the knapsack to form a double ply between which the flap 84 on the closure may be received. Suitable cooperating fastening means is provided on the flaps 84 and 86, such as snap fasteners indicated at 88 for securing the closure in closed position and forming a seal between the closure and knapsack which is substantially weather proof.

Preferably, the knapsack 66 is so arranged on the body member 74 that the closure 82 is at its trailing end. Thus, when the load carrying device is being manually borne, the closure 82 will face upwardly so that the weight of the contents of the knapsack 66 will not be borne by the closure 82.

From the above description of the construction of the improved load carrying device of the present invention, its many advantages should be apparent particularly, when it is to be used by military personnel.

While a preferred embodiment of the invention has been shown and described, it will be apparent that numerous variations and modifications thereof may be made without departing from the underlying principles of the invention. It is desired, therefore, by the following claims, to include within the scope of the invention, all such variations and modifications by which substantially the results of the invention may be obtained through the use of substantially the same or equivalent means.

I claim:

1. In a load enclosing and transporting device the combination comprising a packboard adapted for manual carrying of a load, a rigid body member having at least one side wall arcuately curved adjacent at least one end thereof to provide a prow for said rigid body member when it is desired slidably to transport the same over snow or ice covered terrain, a wall of flexible fabric-like material connected adjacent one edge thereof to the peripheral edge of said rigid body member throughout the length of said edge of the latter, and means to form a connection between the opposite edge of said fabric wall and said packboard for bringing the latter, said fabric wall and said rigid body member into cooperative relationship to form a knapsack container adapted to enclose a load to be transported, said connecting means being releasable along at least a portion of its extent so that access may be had to the interior of said knapsack by releasing said packboard.

2. In a load enclosing and transporting device the combination comprising a packboard adapted for manual carrying of a load, a rigid body member having at least one side wall arcuately curved adjacent at least one end thereof to provide a prow for said rigid body member when it is desired slidably to transport the same over snow or ice covered terrain, a wall of flexible material connected adjacent one edge thereof to the peripheral edge of said rigid body member throughout the length of the said edge of the latter, means to form a connection between said flexible wall and packboard for bringing said packboard, flexible wall and rigid body member into cooperative relationship to form a knapsack container adapted to enclose a load to be transported, said connecting means being releasable along at least a portion of its extent so that access may be had to the interior of said knapsack by releasing said packboard, and releasable means extending between and operatively connected to said packboard and rigid body member adjacent the respective peripheral edges thereof for drawing the latter two elements together and thereby adjusting the same to the enclosed load.

3. In a load enclosing and transporting device the combination comprising a packboard adapted for manual carrying of a load, a rigid body member having at least one side wall arcuately curved adjacent at least one end thereof to provide a prow for said rigid body member when it is desired slidably to transport the same over snow and ice covered terrain in the manner of a sled, a closed frame adapted closely to surround the periphery of said packboard, a wall of flexible fabric material substantially centrally apertured to define an inner periphery dimensioned relatively closely to encompass the frame and an outer peripheral edge, means to secure the inner and outer peripheral edges of said fabric wall respectively to said frame and the peripheral edges of said rigid body member, said rigid body member, connecting means and frame together forming a container to which access may be had through the opening in said frame, and means to connect said packboard and frame along contiguous edges thereof so as to close the said container including means releasable to permit separation of the packboard and frame along at least a portion of the contiguous edges thereof so that access may be had to the interior of the said container through said frame, said carrying device being adapted to be manually transported by means of the packboard or to be transported over snow or ice covered terrain upon said rigid body member as a sled.

4. In a load enclosing and transporting device, the combination comprising a rigid body member having at least one side wall arcuately curved adjacent at least one end thereof to provide a prow for said rigid body member when it is desired slidably to transport the same over snow or ice covered terrain in the manner of a sled, a rigid closed frame defining a rectilinear opening, means for connecting said frame and rigid body member including a flexible fabric like wall having opposite peripheral edges connected respectively to the outer peripheral edges of said frame and the peripheral edges of said rigid body member, a rectilinear packboard adapted for manual carrying of a load, said packboard being dimensioned closely to fit within the opening defined by said frame, means forming a hinged connection between one edge of said packboard and one of the inner edges of said frame, releasable means to connect other continuous edges of said packboard and frame, said packboard, frame, rigid body member and connecting means cooperating to form a container to which access may be had through said frame by swinging said packboard on its hinged edge when the releasable means is released and adapted to be manually transported by means of said packboard or to be transported over snow or ice covered terrain on said rigid body member as a sled.

5. In a load enclosing and transporting device, the combination comprising a rigid body member terminating along at least one edge thereof in a substantially arcuate shaped portion to provide a prow for said rigid body member when it is desired slidably to transport the same over snow or ice covered terrain in the manner of a sled, a rigid closed frame defining a rectilinear opening, means for connecting said frame and rigid body member including a wall of flexible fabric like material having opposite peripheral edges connected respectively to the outer peripheral edges of said frame and the periphery of said rigid body member, a rectilinear packboard adapted for manual carrying of a load and dimensioned closely to fit within the opening in said frame, means forming a hinged connection between one edge of said packboard and a contiguous edge of said frame, releasable means to connect other contiguous edges of said packboard and frame, and lacing cords laced between the outer peripheral edges of said frame and the peripheral edges of said rigid body member and adapted to be loosened or tightened to increase or decrease the load carrying capacity of said device, said packboard, frame, rigid body member and connecting means together forming a container suitable for use as a knapsack to which access may be had through said frame when said releasable means is released and adapted to be manually transported by means of said packboard or to be transported over snow or ice covered terrain on said rigid body member as a sled.

6. In a load carrying device the combination comprising a packboard adapted for manual carrying of a load, a rigid body member terminating along at least one edge thereof in a substantially arcuate shaped portion forming a prow to adapt said rigid body member for transportation over snow or ice covered terrain in the manner of a sled, means connecting said rigid body member and packboard including a wall of flexible fabric-like material extending between said packboard and said rigid body member, said rigid body member, packboard and connecting means together forming a knapsack container open at one end and adapted to be manually transported by means of said packboard or to be transported over snow or ice covered terrain on said rigid body member as a sled, a closure for the open end of said knapsack container fixed along one edge thereof, said closure having a flap along its free edges, and means including fastening means on the peripheral edges of the open end of said knapsack container cooperating with said flap to form a weather-proof seal between the closure and connecting means when the closure is in closed position.

7. In a load enclosing and transporting device the combination comprising a packboard, a rigid body member having at least one side wall arcuately curved adjacent at least one end thereof to provide a prow for the body when it is desired slidably to transport the same upon snow or ice covered terrain, and means for connecting together the packboard and rigid body member including a wall of flexible material therebetween operatively connected adjacent opposite marginal portions thereof respectively to the periphery of said packboard and the periphery of said rigid body member and continuous throughout the peripheries of the said latter two elements so as to cooperate with the said two elements in forming a container susceptible to enclosing a load and releasable means extending between and operatively connected to said packboard and rigid body member adjacent the respective peripheral edges thereof for drawing the latter two elements together and thereby adjusting the same to the enclosed load.

8. A load enclosing and transporting device as defined in claim 7 wherein said rigid body member has a bottom and upstanding sides in addition to said arcuately curved side so as to define an open topped shell generally similar in shape to a flat bottomed boat.

9. A load enclosing and transporting device as defined in claim 7 wherein the releasable means comprises one or more draw cords in operative lacing engagement with said packboard and rigid body member adjacent the respective peripheries thereof over a major portion of the length of the said peripheries.

10. A load enclosing and transporting device as defined in claim 7 wherein one end only of the rigid body member is arcuately curved so that the said rigid body member is shaped similar to a toboggan.

11. In a load enclosing and transporting device the combination comprising a packboard, a rigid body member having at least one side wall arcuately curved adjacent at least one end thereof to provide a prow for the body when it is desired slidably to transport the same upon snow or ice covered terrain, means for connecting together the packboard and rigid body member including a wall of flexible material therebetween operatively connected adjacent opposite marginal portions thereof respectively to the periphery of said packboard and the periphery of said rigid body member and continuous throughout the peripheries of the said latter two elements so as to cooperate with the said two elements in defining a container susceptible to enclosing a load and releasable means extending between and operatively connected to said packboard and rigid body member adjacent the respective peripheral edges thereof for drawing the latter two elements together and thereby adjusting the same to the enclosed load, and means including separable cooperating portions in a portion of the structure forming the wall of the load container thus defined through which access may be had to the interior thereof including releasable means to lock the separable portions together.

JOSEPH A. FANELLI.

References Cited in the file of this patent

UNITED STATES PATENTS

| Number | Name | Date |
| --- | --- | --- |
| 2,314,293 | Tyndall | Mar. 16, 1943 |
| 2,316,456 | Robes, Jr. | Apr. 13, 1943 |
| 2,533,951 | Patriarche | Dec. 12, 1950 |

FOREIGN PATENTS

| Number | Country | Date |
| --- | --- | --- |
| 474,755 | France | Dec. 22, 1914 |
| 214,064 | Switzerland | June 16, 1941 |